July 1, 1969 F. R. MOORE 3,453,401

GROUNDING SHOE FOR DISTRIBUTING TERMINAL ASSEMBLY

Filed Oct. 17, 1966

INVENTOR.
FRANCIS R. MOORE
BY Harry A. Herbert Jr. and
Arsen Tashjian
ATTORNEYS 3,453,401

GROUNDING SHOE FOR DISTRIBUTING TERMINAL ASSEMBLY

Francis R. Moore, 1325 Butternut St., Utica, N.Y. 12102

Filed Oct. 17, 1966, Ser. No. 588,272
Int. Cl. H04m 1/24
U.S. Cl. 179—175 3 Claims

ABSTRACT OF THE DISCLOSURE

A device to be used to apply ground simultaneously to a plurality of telephone control leads to determine their potential for testing purposes.

The invention described herein may be manufactured and used by or for the United States Government for governmental purposes without payment to me of any royalty thereon.

This invention relates to a multi-contact jack testing unit and, more particularly, to a multi-contact grounding shoe for use in testing the condition of the control leads in the step-by-step switching apparatus in the distributing terminal assembly of a telephone central office.

In the operation of a telephone central office, the equipment is often subject to malfunction. This can be caused by a number of different conditions and can produce a corresponding number of difficulties. One of the more common difficulties which can arise in a step-by-step system, such as found in present day central offices, is failure of one or more of the control leads which operate to control the switches in the switch train. Some of the conditions that can occur if these control leads malfunction include: two parties on the same line, dialing and falling back to dial tone, over-ride of telephone numbers dialed, get wrong telephone number when dialing, and holding up of necessary equipment in a central office.

Heretofore, in order to test the control leads in a central office, it was necessary to check each and every control lead by attaching an alligator clip to the questionable terminal and grounding the other end of the test lead. This procedure is slow and time consuming for the testing technician and also allows a chance for errors to arise such as neglecting to check one or more of a series of terminal points or, since the terminal points are in close proximity to one another, there is a possibility of inadvertently shorting the terminals to each other which could produce an erroneous indication.

The present invention provides a quick and easy method of testing a large number of closely situated control leads. There is no possibility of shorting adjacent terminals nor failing to test one or more of the leads by inadvertently skipping over it. A single technician, using the embodiment of the invention herein disclosed, can perform the check out grounding operation on the control leads of a distributing terminal assembly ten times more rapidly with more accuracy and little or no chance of error. Many man hours are saved by use of the grounding shoe according to the present invention because very little effort is required for attaching and removing the shoe from the terminal assembly. Thus a far more efficient and accurate testing arrangement is disclosed which overcomes the inherent disadvantages found in the present testing procedures for trouble-shooting central office control lead malfunctions.

Accordingly, it is an object of the present invention to provide a multi-contact jack for attachment to a telephone central office terminal assembly for use in testing the condition of a plurality of control leads associated therewith.

Another object of the invention is to provide a grounding shoe for a distributing terminal assembly which is quickly and easily attachable and removable while being capable of providing low resistance contact between the associated elements.

Still another object of the invention is to provide a novel multi-contact connecting jack which is relatively simple in construction and which can be readily attached and detached many times from matching plug elements producing only a minimum wearing of the contacting elements.

A further object of the present invention is to provide testing apparatus which is adapted to ground a large number of adjacent terminal points simultaneously in order to locate any malfunction of the equipment being tested.

A still further object of the invetnion is to provide a new and improved multi-contact terminal jack that is simple in construction, reliable in operation, and durable in use and manufactured from readily available materials.

These and other objects, features and advantages will become more apparent after considering the following detailed description taken in conjunction with the annexed drawings and appended claims.

In the drawings, wherein like reference characters refer to like parts in the several views.

Figures 1, 2, 3, 4:
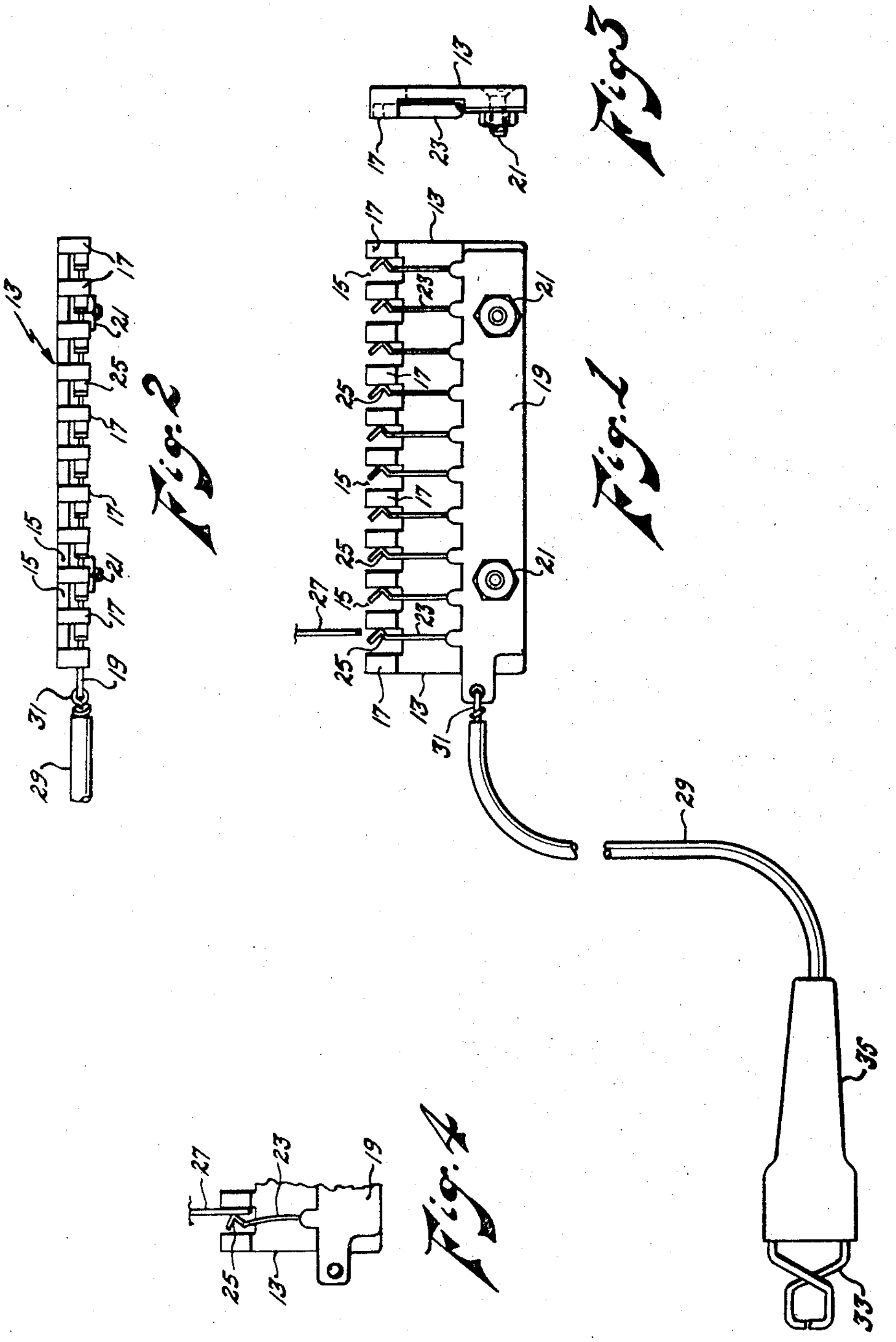
FIGURE 1 is a plan view of a multi-contact terminal jack grounding shoe according to the invention including an attached grounding clip.
FIGURE 2 is a top view of the terminal jack of FIGURE 1.
FIGURE 3 is an end view of the terminal jack of FIGURE 1 showing some detail of the contact element.
FIGURE 4 is a view in side elevation of one of the contact elements of FIGURE 1 with the associated plug element in position.

Referring now to the drawings, the novel multi-contact terminal jack illustrated therein includes a substantially rectangular block 13 molded or otherwise formed of a suitable dielectric material of nonconducting plastic, such as, for example, Zytel 113 or equivalent. A plurality of equally spcaed openings 15 separated by a corresponding plurality of inwardly extending protuberances 17 are disposed along the upper edge of the plastic block 13. As shown, the block 13 contains ten equally spaced openings 15 between eleven inwardly extending protuberances 17, but it should be understood that the number thus employed may be varied by correspondingly changing the size of the block 13. The rectangular block 13 is formed in a flat configuration having a relatively thin central portion of the upstanding wall section with a heavier lower portion and inwardly extending protuberances 17 at the upper portion. This arrangement is shown more clearly in FIGURE 3.

A contact plate 19 is formed of a suitable, resilient, electrically conductive material, such as, for example, Phosphor bronze. The contact plate 19 is fixedly attached to the heavier lower potrion of the block 13 by means of the screw and nut members 21. A plurality of upwardly extending strip portions 23 of the contact plate 19 are equally spaced along the contact plate 19 and integral therewith. Each of the strip portions 23 is twisted to a 90° angle and terminates at the upper extremity in an angular V-shaped configuration 25 which is disposed in one of the spaced openings 15 in alignment with the corresponding strip portions 23. The vertex portion of each of the V-shaped upper extremity 25 of the strip portions 23 is held in contact with one side wall of the correspondingly inwardly extending portion 17 by the natural springiness of the material of which the contact plate 19 is fabricated. A plug member 27 is adapted to fit between the V-shaped extremity 25 and the portion 17 and the natural resiliency of the plate material 19 is effective to apply sufficient pressure at the contact area to insure the required electrical connection.

In accordance with the invention as illustrated by the embodiment herein described, one end of an insulated cable 29 is soldered to the contact plate 19 at the point 31. The other end of the cable 29 is terminated by the alligator clip 33 which likewise is soldered to the cable 29. An insulated sleeve 35 is provided to cover a portion of the clip 33 so that it can be more safely handled. The view of the grounding shoe in FIG. 4 includes the plug member 27 held in position in contact with the V-shaped extremity 25 of the upwardly extending strip portions 23 of the contact plate 19 and it is obvious that any current flowing from the plug member 27 will pass through the contact plate 19 and the attached cable 29 to ground when the alligator clip 33 is attached to a suitable grounding point.

In actual use, the described ten contact grounding shoe is capable of receiving and electrically connecting ten conductors, such as, for example, adjacent control leads in a step-by-step telephone central office to a suitable ground. It will be apparent that the invention may be employed for other uses, such as, for electrically interconnecting various telephone equipment and that any reasonable number of contacting elements may be utilized depending on the particular electrical equipment and purpose for which the connections are desired. Also, the hereinbefore described grounding shoe is simple in construction and may be easily and inexpensively manufactured so that it can be made available in quantity for use by technicians faced with the problem of testing large numbers of control leads.

Although the invention has been illustrated in the accompanying drawings and described in the foregoing specification in terms of a preferred embodiment thereof, it should be understood that the invention is not limited to this embodiment or to the particular uses mentioned. It will be apparent to those skilled in the art that the invention may be employed in other fields where it is required to quickly connect and disconnect a large number of electrical terminals to a common point, such as ground. Various changes, alterations, modifications, and substitutions, particularly with respect to the construction details and the number of contacts in the terminal block, can be made in arrangement and location of the several elements without departing from the spirit and scope of the appended claims.

Having thus set forth and disclosed the nature of my invention, what I claim and desire to secure by Letters Patent of the United States is:

1. A multi-contact jack terminal for simultaneously grounding a plurality of control leads on telephone central office step-by-step switching apparatus, said jack terminal comprising an elongated rectangular block member of molded dielectric material, said block member being formed in a substantially flat configuration having a relatively thin central portion and a heavier lower portion, a plurality of inwardly extending protuberances along the upper portion of said block, said protuberances being separated by a corresponding plurality of spaced openings therebetween, a flat metallic contact plate fixedly attached to the heavier lower portion of said rectangular block member, a plurality of strip portions extending upwardly on said contact plate and integral therewith, each of said strip portions being twisted to a 90° angle, an angular V-shaped formation at the upper extremity of each of said upwardly extending strip portions, one of said V-shaped formations being disposed in each of the plurality of spaced openings in said block in alignment with the corresponding strip portions, the vertex portion of said V-shaped formation being in contact with the side wall of one of the inwardly extending protuberances, and an insulated cable conductively connected to said contact plate, said insulated cable having clip means attached to its outer terminal end for carrying current which may be flowing through said contact plate and said cable to a suitable grounding point when attached thereto.

2. The multi-contact jack terminal defined in claim 1 wherein the flat metallic contact plate including the upwardly extending strip portions and V-shaped end formations is formed of Phosphor bronze material having the physical properties of being resilient and electrically conductive.

3. The multi-contact jack terminal defined in claim 2 wherein electrical conducting means are removably insertable between the vertex portion of the V-shaped ends of the upwardly extending strip porttions of said contact plate and the adjacent inwardly extending protuberances, the natural resiliency of said contact plate tightly holding said V-shaped end in close electrical contact with said conducting means to allow current therefrom to pass between the conducting means and the contact plate.

References Cited

UNITED STATES PATENTS 1,519,499 12/1924 Menefee ------------ 179—175
2,849,700 8/1958 Perkin -------------- 179—98

KATHLEEN H. CLAFFY, *Primary Examiner.*

J. S. BLACK, *Assistant Examiner.*

U.S. Cl. X.R.

179—97; 339—28